(12) United States Patent
Kota

(10) Patent No.: US 11,170,005 B2
(45) Date of Patent: Nov. 9, 2021

(54) ONLINE RANKING OF QUERIES FOR SPONSORED SEARCH

(71) Applicant: Yahoo Holdings, Inc., Sunnyvale, CA (US)

(72) Inventor: Nagaraj Kota, Sunnyvale, CA (US)

(73) Assignee: VERIZON MEDIA INC., New York, NY (US)

( * ) Notice: Subject to any disclaimer, the term of this patent is extended or adjusted under 35 U.S.C. 154(b) by 752 days.

(21) Appl. No.: 15/285,318

(22) Filed: Oct. 4, 2016

(65) Prior Publication Data

US 2018/0095967 A1   Apr. 5, 2018

(51) Int. Cl.
| | |
|---|---|
| *G06F 16/2457* | (2019.01) |
| *G06F 16/31* | (2019.01) |
| *G06F 16/951* | (2019.01) |
| *G06F 16/901* | (2019.01) |
| *G06F 16/33* | (2019.01) |
| *G06N 5/02* | (2006.01) |
| *G06Q 30/02* | (2012.01) |
| *G06N 20/10* | (2019.01) |
| *G06N 20/00* | (2019.01) |

(52) U.S. Cl.
CPC ...... *G06F 16/24578* (2019.01); *G06F 16/316* (2019.01); *G06F 16/334* (2019.01); *G06F 16/9024* (2019.01); *G06F 16/951* (2019.01); *G06N 5/022* (2013.01); *G06N 20/00* (2019.01); *G06N 20/10* (2019.01); *G06Q 30/0256* (2013.01)

(58) Field of Classification Search
CPC .............. G06F 16/24578; G06F 16/334; G06F 16/316; G06F 16/951; G06N 20/00; G06N 20/10; G06N 5/022; G06Q 30/0256

USPC ........................................................ 707/723
See application file for complete search history.

(56) References Cited

U.S. PATENT DOCUMENTS

| | | | | |
|---|---|---|---|---|
| 8,700,544 | B2 * | 4/2014 | Sontag | G06F 16/93 706/12 |
| 2008/0154877 | A1 * | 6/2008 | Joshi | G06F 16/332 |
| 2010/0185687 | A1 * | 7/2010 | Chung | G06Q 30/02 707/803 |
| 2011/0060733 | A1 * | 3/2011 | Peng | G06F 16/9535 707/723 |
| 2011/0099059 | A1 * | 4/2011 | Agarwal | G06Q 30/02 705/14.43 |
| 2011/0208730 | A1 * | 8/2011 | Jiang | G06F 16/951 707/727 |

(Continued)

OTHER PUBLICATIONS

Broder A, Ciccolo P, Gabrilovich E, Josifovski V, Metzler D, Riedel L, Yuan J. Online expansion of rare queries for sponsored search. InProceedings of the 18th international conference on World wide web Apr. 20, 2009 (pp. 511-520). (Year: 2009).*

(Continued)

*Primary Examiner* — Mohsen Almani
(74) *Attorney, Agent, or Firm* — Cooper Legal Group LLC

(57) ABSTRACT

A system and method for ranking query-advertisement combinations is disclosed. Embodiments use an online component to enhance and rank query ad combinations. The query ad combination is then reranked with a trained factorization machine. The subsequent list of ranked query-ad combinations is then output. The output may be to an auction for determine ad-query combinations having the greatest expected revenue.

19 Claims, 5 Drawing Sheets

(56) References Cited

U.S. PATENT DOCUMENTS

| | | | | |
|---|---|---|---|---|
| 2012/0030228 | A1* | 2/2012 | Naidu | G06F 16/951 |
| | | | | 707/767 |
| 2012/0059713 | A1* | 3/2012 | Galas | G06Q 30/0247 |
| | | | | 705/14.49 |
| 2012/0158685 | A1* | 6/2012 | White | G06F 16/9535 |
| | | | | 707/706 |
| 2013/0018729 | A1* | 1/2013 | Liu | G06Q 30/0277 |
| | | | | 705/14.54 |
| 2013/0124493 | A1* | 5/2013 | Lang | G06F 16/951 |
| | | | | 707/706 |
| 2014/0172899 | A1* | 6/2014 | Hakkani-Tur | G06Q 10/02 |
| | | | | 707/759 |
| 2014/0379323 | A1* | 12/2014 | Anastasakos | G06F 16/3329 |
| | | | | 704/9 |
| 2015/0186938 | A1* | 7/2015 | Zhang | G06Q 30/0256 |
| | | | | 705/14.54 |
| 2015/0278355 | A1* | 10/2015 | Hassanpour | G06F 16/951 |
| | | | | 707/706 |
| 2016/0189218 | A1 | 6/2016 | Kota | |
| 2017/0039269 | A1* | 2/2017 | Raff | G06F 16/90335 |
| 2017/0097986 | A1* | 4/2017 | Zhu | G06F 16/3326 |
| 2018/0052885 | A1* | 2/2018 | Gaskill | G06N 5/022 |

OTHER PUBLICATIONS

Shen, Dou, et al. "Query enrichment for web-query classification." ACM Transactions on Information Systems (TOIS) 24.3 (2006): 320-352. (Year: 2006).*

Shen, Dou, et al. "Building bridges for web query classification." Proceedings of the 29th annual international ACM SIGIR conference on Research and development in information retrieval. 2006. (Year: 2006).*

Cui, Hang, et al. "Probabilistic query expansion using query logs." Proceedings of the 11th international conference on World Wide Web. 2002. (Year: 2002).*

Cao, Huanhuan, et al. "Context-aware query classification." Proceedings of the 32nd international ACM SIGIR conference on Research and development in information retrieval. 2009. (Year: 2009).*

Azimi, Javad et al., article titled "Ads Keyword Rewriting Using Search Engine Results", World Wide Web 2015 Companion conf. May 18-22, 2015, pp. 3-4.

Broder, Andrie et al., article titled "Online Expansion of Rare Queries for Sponsored Search", World Wide Web 2009 conference Apr. 20-24, 2009, 10 pages.

* cited by examiner

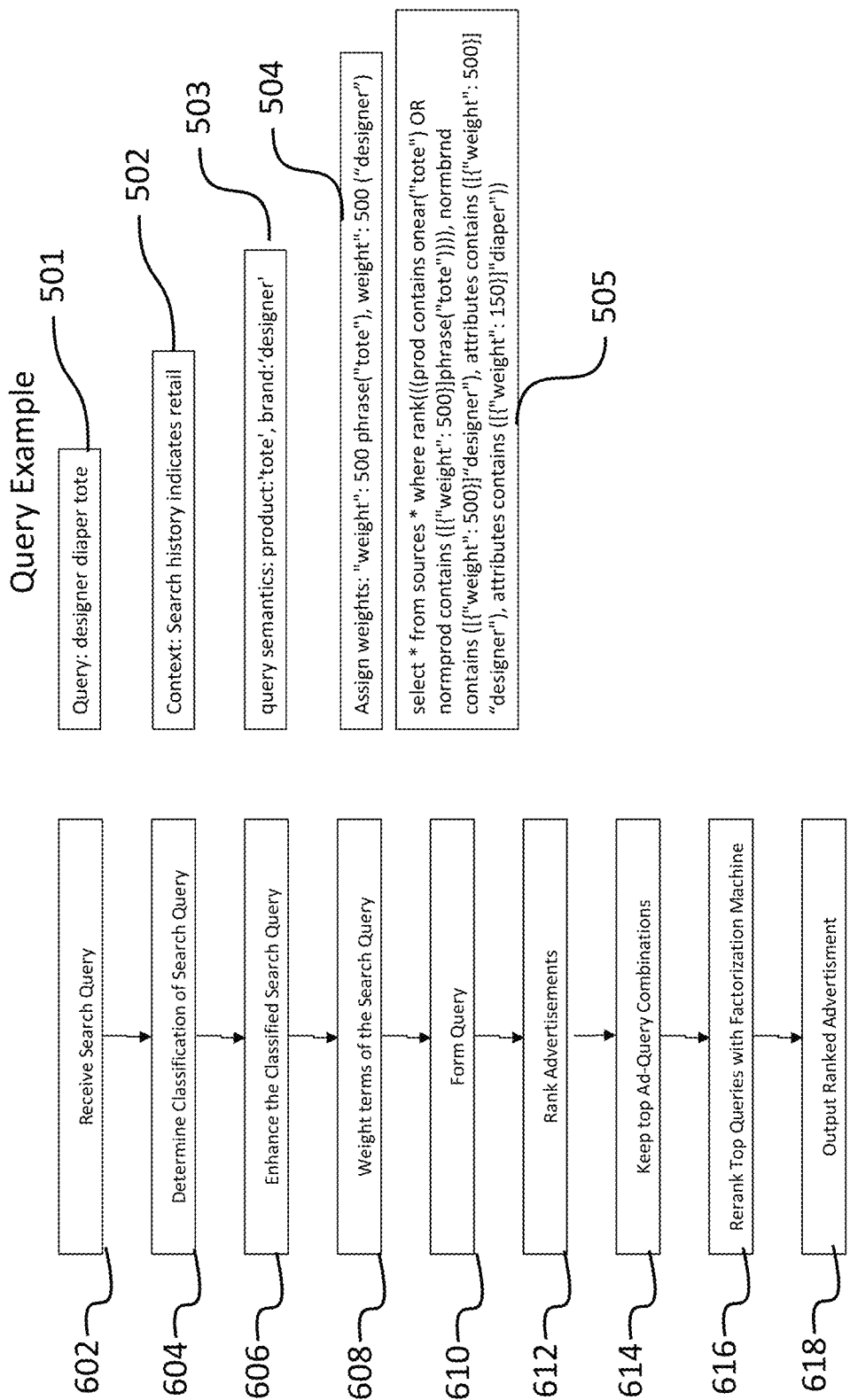

ONLINE RANKING OF QUERIES FOR SPONSORED SEARCH

BACKGROUND

1. Technical Field

The disclosed embodiments are related to internet advertising and more particularly to systems and methods for matching advertisements to search queries.

2. Background

Internet advertising is a multi-billion dollar industry and is growing at double digit rates in recent years. It is also the major revenue source for internet companies such as Yahoo!® that provide advertising networks that connect advertisers, publishers, and Internet users. As an intermediary, these companies are also referred to as advertiser brokers or providers. New and creative ways to attract attention of users to advertisements ("ads") or to the sponsors of those advertisements help to grow the effectiveness of online advertising, and thus increase the growth of sponsored and organic advertising. Publishers partner with advertisers, or allow advertisements to be delivered to their web pages, to help pay for the published content, or for other marketing reasons.

Search engines assist users in finding content on the Internet. A user enters a query for information they are searching for, and the search engine returns results matching their query. In the search ad marketplace, ads are displayed to a user alongside the results of a user's search. Ideally, the displayed ads will be of sufficient interest to the user and result in the user clicking through an ad. In order to increase the likelihood of a user clicking through the ad, an ad may be selected for display by matching query terms contained in the search with bid terms provided by the advertiser. An advertiser may select specific bid terms that they believe will match a potential consumer's interest with their advertisement.

There currently exists a breadth of techniques in search-ads matching, involving text retrieval, query-rewriting/query-expansion at supply side, and doc-expansion/bid-term optimization from demand side. Methods range from offline to online based on dictionary lookup and index based retrieval with strict latency constraints. These matching algorithms leverage subsets of available information such as click-logs or session/browse-trails, and optimize for semantic relevance between source query and target ad, measured using common scoring such as word2vec similarity score, translation score, graph distance measure etc.

However, these current solutions have difficulty matching ads for tail/new queries due to a lack of history and/or explicit/implicit user feedback. For example, bidterms such as 'roxy pink sunset surfdrive 8gb usb drives' may not appear in search logs as they may be uncommon, or too specific, i.e. a tail query. Additionally, there may be new queries for which there are not any rewrites in the system, or past performance data. Given the lack of history, current systems are unable match these queries and ads. It would be beneficial to develop a new system and method for matching queries and ads that would allow for matching of new/tail queries with bidterms and associated advertisements.

BRIEF SUMMARY

In one aspect of the disclosure a method of ranking advertisements is described. The method includes receiving a search query, determining a classification of the search query based on an intent of the search query, resulting in a classified search query, enhancing the classified search query using semantics associated with the classification resulting in an enhanced query, weighing terms of the enhanced query dependent upon the classification to obtain a weighted query, forming a retrieval search query for an ad ranking machine from the weighted query, ranking a plurality of advertisements based on relatedness to the retrieval search query, keeping the top k advertisement-retrieval search query combinations for further processing, inputting the top k advertisement-retrieval search query combinations into a trained learning machine ranking model to rerank the top advertisement-retrieval search query combinations, and outputting a plurality of reranked advertisement-retrieval search query combinations.

In some embodiments, determining a classification of the search query includes performing a multi-level classification of the query. In some embodiments, enhancing the classified search query includes extracting semantics from the classified search query using a named entity recognizer. In some embodiments, relatedness to the ad query includes a ranking algorithm selected from the group consisting of BM 25 ranking function, term frequency-inverse document frequency ranking function, nativeRank ranking function, and a language model ranking function.

In some embodiments, the method further includes expanding the terms of the enhanced query prior to forming the retrieval search query. In some embodiments, the method further includes building an ad-query index relating ads to query terms. In some embodiments, the method further includes building a design matrix from a data source, and training a factorization machine to obtain a vector for each feature of the design matrix. In some embodiments, the data source includes a search log. In some embodiments, the data source is enhanced with a knowledge graph for a particular classification.

In another aspect of the disclosure, a system for ranking advertisements is described. The system includes an offline component and an online component. The offline component includes a factorization machine configured to build a to build a linear, multi-dimension vector for each feature of a design matrix, and a indexing component configured to build an index relating queries and ads. The online component includes a query matching component utilizing the index to match received queries to a plurality of advertisement, an advertising ranking component configured to utilize the linear, multi-dimension vector to rank the plurality of advertisements, and an ad serving component configured to output the plurality of ranked advertisements.

In some embodiments, the factorization machine is further configured to receive a search log and to build the design matrix from the search log. In some embodiments, the factorization machine is further configured to receive a knowledge graph and enhance the search log with the knowledge graph.

In some embodiments, the query matching component is further configured to implement functions including receive a search query, determine a classification of the search query based on an intent of the search query, resulting in a classified search query, enhance the classified search query using semantics associated with the classification resulting in an enhanced query, weigh terms of the enhanced query dependent upon the classification to obtain a weighted query, form a retrieval search query for an ad ranking machine from the weighted query, and rank a plurality of advertisement retrieved from the ad ranking machine based on relatedness to the retrieval search query.

In some embodiments, determining a classification of the search query includes performing a multi-level classification of the search query. In some embodiments, enhancing the classified search query includes extracting semantics from the classified search query with a named entity recognizer. In some embodiments, relatedness to the ad query includes a ranking algorithm selected from the group consisting of BM 25 ranking function, term frequency-inverse document frequency ranking function, nativeRank ranking function, or a language model ranking function. Some embodiments, the system expands the terms of the enhanced query prior to forming the ad query.

BRIEF DESCRIPTION OF THE DRAWINGS

FIG. 5 illustrates the formatting of a query as it progresses through the system of FIG. 4.

FIG. 6 illustrates a method of recommending a query.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, the disclosed embodiments relate to systems and methods for matching queries with advertisement, particularly new queries and tail queries. The systems and methods are able match new/tail queries with keywords and significantly increase coverage for otherwise difficult to match advertisements and tail/new queries.

Network

Figure 1:
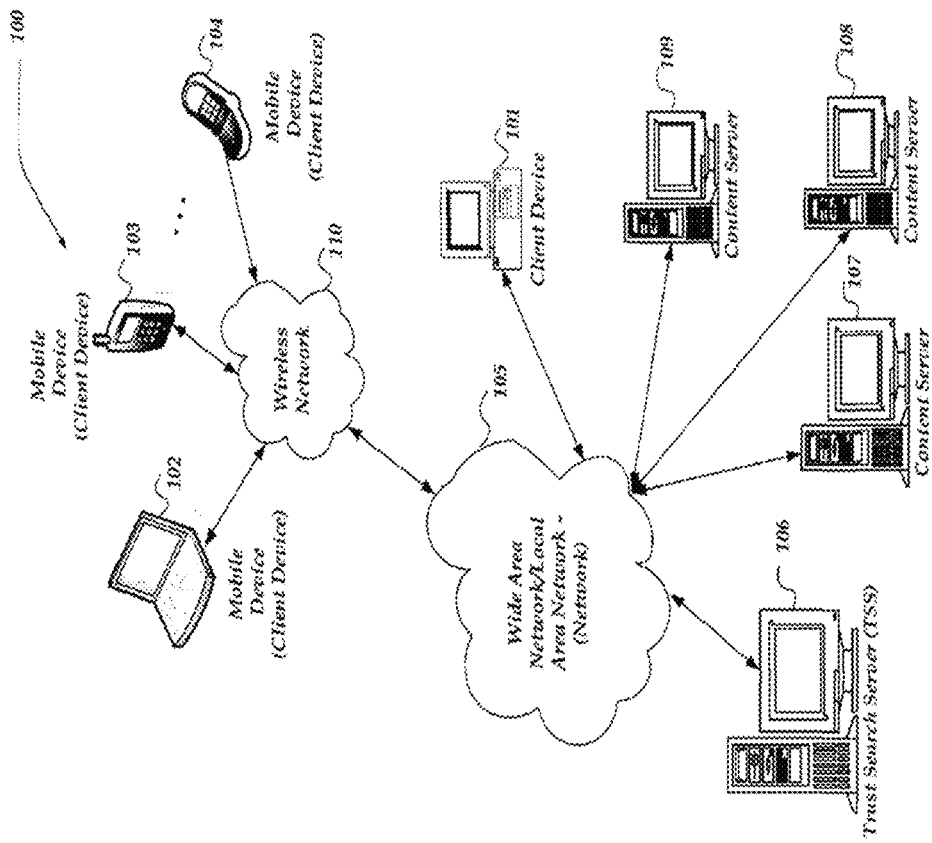
FIG. 1 illustrates an exemplary embodiment of a network system.

FIG. 1 is a schematic diagram illustrating an example embodiment of a network 100 suitable for practicing the claimed subject matter. Other embodiments may vary, for example, in terms of arrangement or in terms of type of components, and are also intended to be included within claimed subject matter. Furthermore, each component may be formed from multiple components. The example network 100 of FIG. 1 may include one or more networks, such as local area network (LAN)/wide area network (WAN) 105 and wireless network 110, interconnecting a variety of devices, such as client device 101, mobile devices 102, 103, and 104, servers 107, 108, and 109, and search server 106.

The network 100 may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Computing Device

Figure 2:
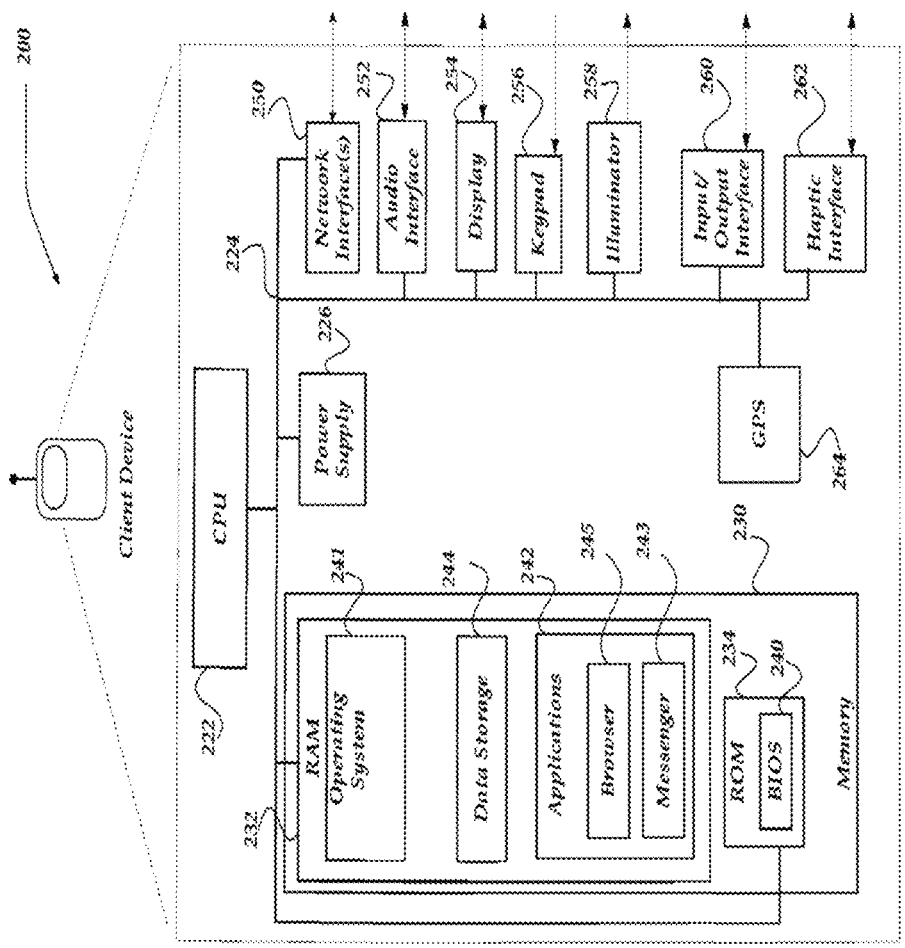
FIG. 2 illustrates a schematic of a computing.

FIG. 2 shows one example schematic of an embodiment of a computing device 200 that may be used to practice the claimed subject matter. The computing device 200 includes a memory 230 that stores computer readable data. The memory 230 may include random access memory (RAM) 232 and read only memory (ROM) 234. The ROM 234 may include memory storing a basic input output system (BIOS) 230 for interfacing with the hardware of the client device 200. The RAM 232 may include an operating system 241, data storage 244, and applications 242 including a browser 245 and a messenger 243. A central processing unit (CPU) 222 executes computer instructions to implement functions. A power supply 226 supplies power to the memory 230, the CPU 222, and other components. The CPU 222, the memory 230, and other devices may be interconnected by a bus 224 operable to communicate between the different components. The computing device 200 may further include components interconnected to the bus 224 such as a network interface 250 that provides an interface between the computing device 200 and a network, an audio interface 252 that provides auditory input and output with the computing device 200, a display 254 for displaying information, a keypad 256 for inputting information, an illuminator 258 for displaying visual indications, an input/output interface 260 for interfacing with other input/output devices, haptic feedback interface 262 for providing tactile feedback, and a global positioning system 264 for determining a geographical location.

Client Device

A client device is a computing device 200 used by a client and may be capable of sending or receiving signals via the wired or the wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features and need not contain all of the components described above in relation to a computing device. Similarly, a client device may have other components that were not previously described. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Servers

A server is a computing device 200 that provides services. Servers vary in application and capabilities and need not contain all of the components of the exemplary computing device 200. Additionally, a server may contain additional components not shown in the exemplary computing device 200. In some embodiments a computing device 200 may operate as both a client device and a server.

Searching

A search engine may enable a device, such as a client device, to search for files of interest using a search query. Typically, a search engine may be accessed by a client device via one or more servers. A search engine may, for example, in one illustrative embodiment, comprise a crawler component, an indexer component, an index storage component, a search component, a ranking component, a cache, a profile storage component, a logon component, a profile builder, and one or more application program interfaces (APIs). A search engine may be deployed in a distributed manner, such as via a set of distributed servers, for example. Components may be duplicated within a network, such as for redundancy or better access.

A crawler may be operable to communicate with a variety of content servers, typically via a network. In some embodiments, a crawler starts with a list of URLs to visit. The list is called the seed list. As the crawler visits the URLs in the seed list, it identifies all the hyperlinks in the page and adds them to a list of URLs to visit, called the crawl frontier. URLs from the crawler frontier are recursively visited according to a set of policies. A crawler typically retrieves files by generating a copy for storage, such as local cache storage. A cache refers to a persistent storage device. A crawler may likewise follow links, such as HTTP hyperlinks, in the retrieved file to additional files and may retrieve those files by generating copy for storage, and so forth. A crawler may therefore retrieve files from a plurality of content servers as it "crawls" across a network.

An indexer may be operable to generate an index of content, including associated contextual content, such as for one or more databases, which may be searched to locate content, including contextual content. An index may include index entries, wherein an index entry may be assigned a value referred to as a weight. An index entry may include a portion of the database. In some embodiments, an indexer may use an inverted index that stores a mapping from content to its locations in a database file, or in a document or a set of documents. A record level inverted index contains a list of references to documents for each word. A word level inverted index additionally contains the positions of each word within a document. A weight for an index entry may be assigned. For example, a weight may be assigned substantially in accordance with a difference between the number of records indexed without the index entry and the number of records indexed with the index entry.

The term "Boolean search engine" refers to a search engine capable of parsing Boolean-style syntax, such as may be used in a search query. A Boolean search engine may allow the use of Boolean operators (such as AND, OR, NOT, or XOR) to specify a logical relationship between search terms. For example, the search query "college OR university" may return results with "college," results with "university," or results with both, while the search query "college XOR university" may return results with "college" or results with "university," but not results with both.

In contrast to Boolean-style syntax, "semantic search" refers a search technique in which search results are evaluated for relevance based at least in part on contextual meaning associated with query search terms. In contrast with Boolean-style syntax to specify a relationship between search terms, a semantic search may attempt to infer a meaning for terms of a natural language search query. Semantic search may therefore employ "semantics" (e.g., science of meaning in language) to search repositories of various types of content.

Search results located during a search of an index performed in response to a search query submission may typically be ranked. An index may include entries with an index entry assigned a value referred to as a weight. A search query may comprise search query terms, wherein a query term may correspond to an index entry. In an embodiment, search results may be ranked by scoring located files or records, for example, such as in accordance with number of times a query term occurs weighed in accordance with a weight assigned to an index entry corresponding to the query term. Other aspects may also affect ranking, such as, for example, proximity of query terms within a located record or file, or semantic usage, for example. A score and an identifier for a located record or file, for example, may be stored in a respective entry of a ranking list. A list of search results may be ranked in accordance with scores, which may, for example, be provided in response to a search query. In some embodiments, machine-learned ranking (MLR) models are used to rank search results. MLR is a type of supervised or semi-supervised machine learning problem with the goal to automatically construct a ranking model from training data.

Content within a repository of media or multimedia, for example, may be annotated. Examples of content may include text, images, audio, video, or the like, which may be processed in the form of physical signals, such as electrical signals, for example, or may be stored in memory, as physical states, for example. Content may be contained within an object, such as a Web object, Web page, Web site, electronic document, or the like. An item in a collection of content may be referred to as an "item of content" or a "content item," and may be retrieved from a "Web of Objects" comprising objects made up of a variety of types of content. The term "annotation," as used herein, refers to descriptive or contextual content related to a content item, for example, collected from an individual, such as a user, and stored in association with the individual or the content item. Annotations may include various fields of descriptive content, such as a rating of a document, a list of keywords identifying topics of a document, etc.

Embodiments of the present disclosure utilize a factorization machine. A factorization machine is a generic modeling framework using high dimensional sparse features. Each entity is a vector of latent factor, with the relevance modeled by the inner-product. The factorization machine is a polynomial regression with factorized high-order parameter. The general formulation of the factorization machine is $$\hat{y}(x) := w_0 + \sum_{i=1}^{n} w_i x_i + \sum_{l=2}^{d} \sum_{i_1=1}^{n} \ldots \sum_{i_l=i_{l-1}+1}^{n} \left( \prod_{j=1}^{l} x_{i_j} \right) \left( \sum_{f=1}^{k_l} \prod_{j=1}^{l} v_{i_j,f}^{(l)} \right)$$

where $w_0$ is the global bias, $\sum_{i=1}^{n} w_i x_i$ is the linear model, and the remaining terms are the polynomial model. Examples of factorization machines may be found in Steffen Rendle (2010): Factorization Machines, in Proceedings of the 10th IEEE International Conference on Data Mining (ICDM 2010) and Steffen Rendle, Zeno Gantner, Christoph Freudenthaler, Lars Schmidt-Thieme (2011): Fast Context-aware Recommendations with Factorization Machines, in Proceeding of the 34th international ACM SIGIR conference on Research and development in information retrieval (SIGIR 2011), which are herein incorporated by reference. In contrast to more conventional models, such as a support vector machine, factorization machines model all interactions between variables using factorized parameters. They are able to estimate interactions even in sparse problems where support vector machines tend to fail.

Figure 3:
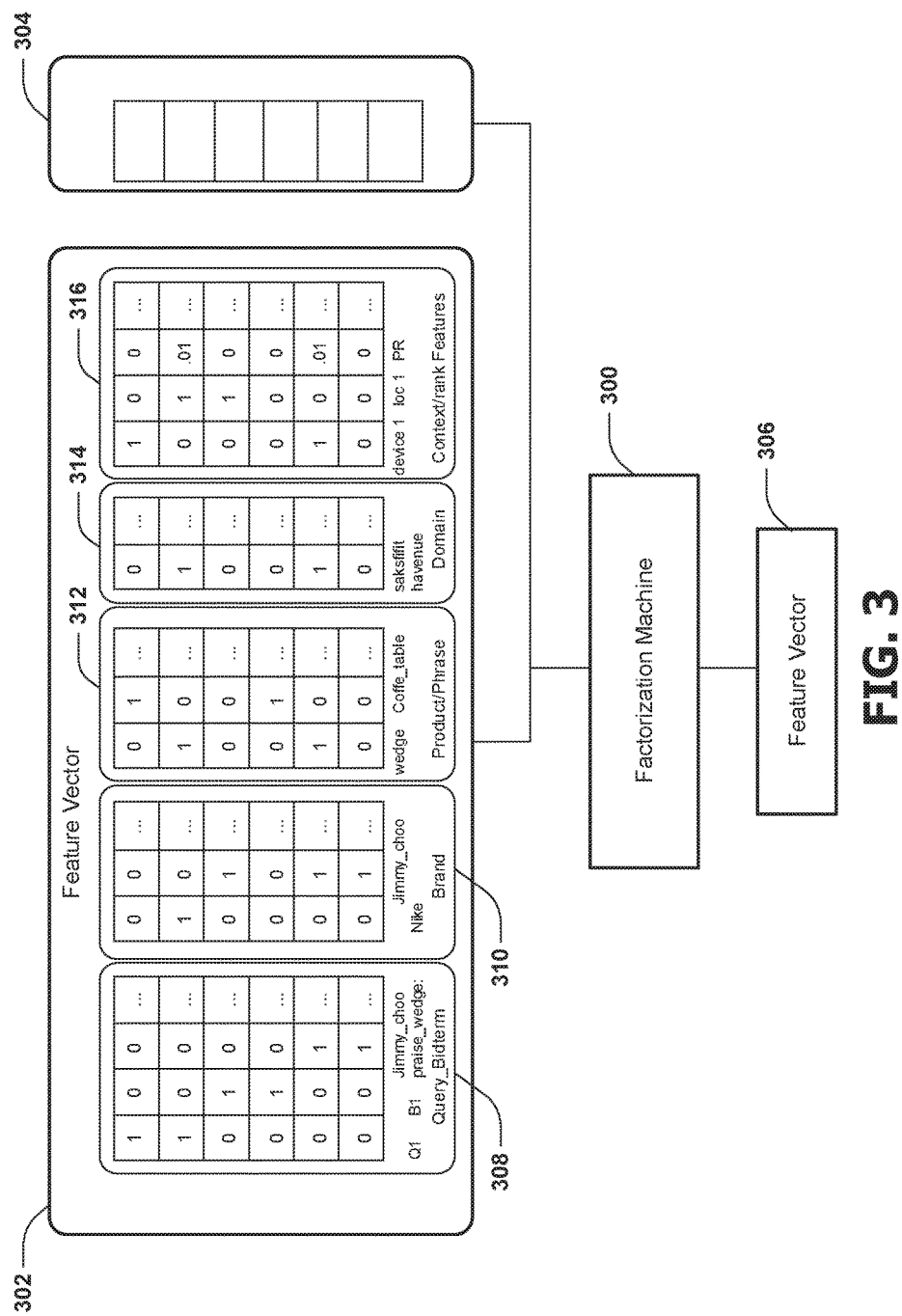
FIG. 3 illustrates a general schematic of a factorization machine.

FIG. 3 illustrates a generic overview of a factorization machine 300 suitable for use with embodiments of the current disclosure. Factorization machine 300 receives as input a design matrix 302. The design matrix 302 shown in FIG. 3 is small portion of an actual design matrix. In actuality, a design matrix 302 is typically comprised of millions of items taken from a data source over an extended period of time. In some embodiments, the design matrix 302 may be obtained from a data source such as a search-log, and a knowledge-base of vertical domains, such as retail. In the example of FIG. 3, design matrix 302 comprises entries such as one or more Query/Bidterm entries 308, one or more Brand entries 310, one or more Product/Phrase entries 312, one or more Domain entries 314, and/or one or more Context/rank Features entries 316. In some examples, the one or more Query/Bidterm entries 308, the one or more Brand entries 310, the one or more Product/Phrase entries 312, the one or more Domain entries 314, the one or more Context/rank Features entries 316 and/or one or more other entries may comprise and/or represent <query, context:{device, time, location}, query semantics:{brand product}, ad:{advertiser_URL_domain, ad_title, ad_semantics, domain_pageRank, domain_popularity}, query_ad_match_features:{tf-idf, bm25, relevance, word2vec score}, label>. An entry in the design matrix 302 may comprise a value of 0. Alternatively and/or additionally, an entry in the design matrix may comprise a value of 1. Alternatively and/or additionally, an entry in the design matrix may not comprise a value (e.g., -). The factorization machine 300 processes the design matrix 302 to learn the factors producing the observed response 304. The result is a linear and k-dimension vector 306 for each of the features that is used to model relatedness.

Overview

Figure 4:
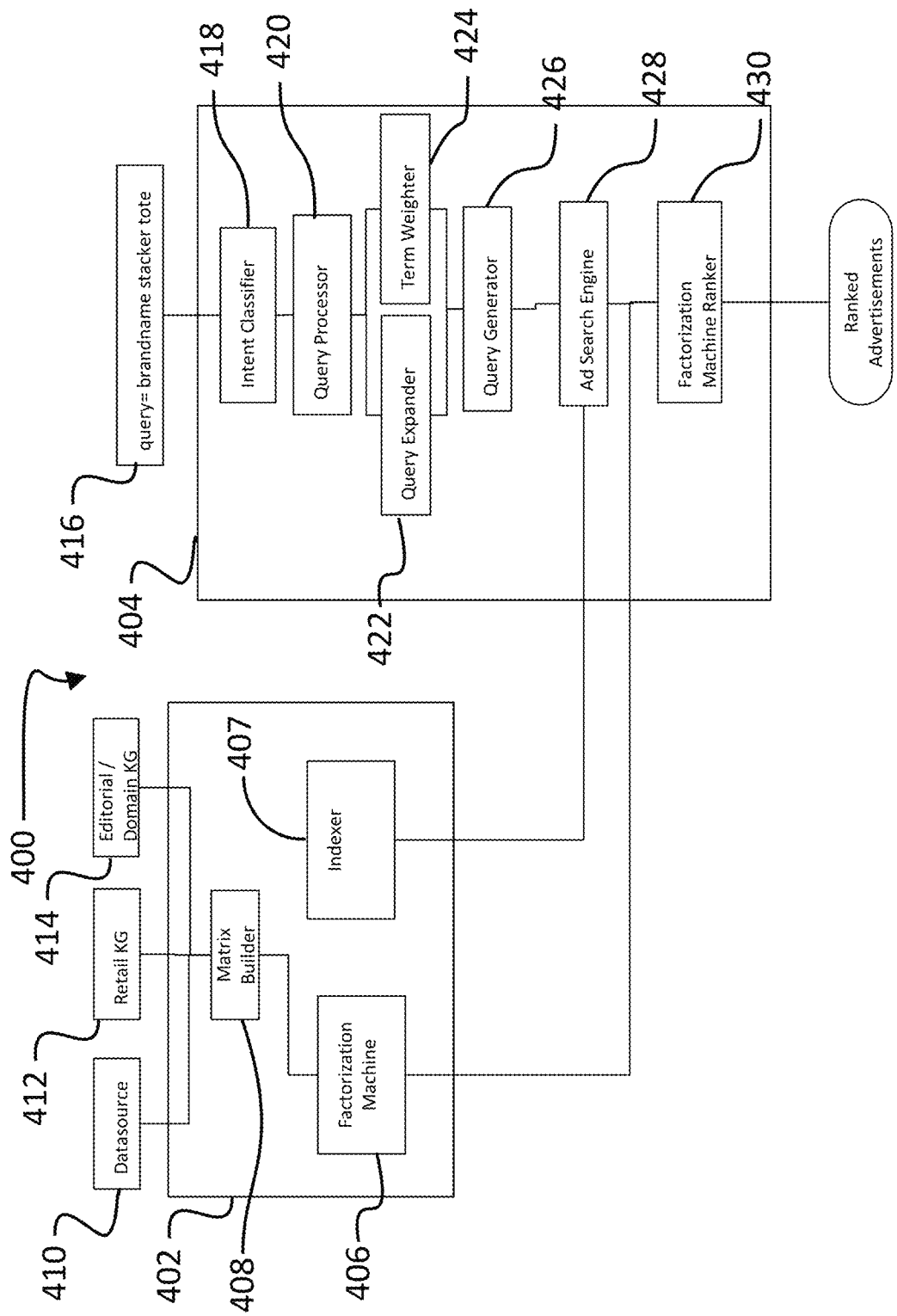
FIG. 4 illustrates a system for ranking advertisements for a query.

Embodiments of the system for matching new/tail queries with sponsored searches include an online query-ads retrieval system in which click through rate/dwell-time is optimized in the matching phase, rather than a standard top-K item semantic retrieval/ranking to maximize clicks before an auction takes place. The system enables tuning to the retrieval of a specific vertical, such as retail which enables increased recall. FIG. 4 illustrates a high level diagram of the system 400 for matching queries with sponsored searches.

As shown in FIG. 4, the system 400 includes an offline component 402 and an online component 404. The offline component 402 is typically executed prior to the receipt of any queries and builds the linear and k-dimension vector for subsequently ranking ads identified as matching a query. The online component 404 executes at the time of receipt of a query and finds related advertisements using an index and ranks the related advertisements using the output of the offline component 402 to match and rank advertisements. The list of ranked advertisements may then be subsequently input into a final click-prediction model to determine an advertisement for searving.

Offline component 402 includes a factorization machine 406 and an indexer 407 for creating an ad-document index such as that described in U.S. Patent Publication 2016/0189218 entitled "SYSTEMS AND METHODS FOR SPONSORED SEARCH AD MATCHING", and U.S. Patent Publication 2014/0108417 entitled "METHOD AND APPARATUS FOR WEB AD MATCHING" which are hereby incorporated by reference. Although indexer 407 is shown as a part of the offline component, it may separate from the factorization machine 406 and executed at a different time. In some embodiments, the system 400 may use an external index built by another party. Matrix builder 408 receives data from a data source 410 such as a search log to build a design matrix. In addition to the data source 410, the matrix builder 408 also receives as an input at least one knowledge graph containing features to augment the data source 410. In the embodiment of FIG. 4, there are two knowledge graphs, a retail knowledge graph 412 with information about retail classifications and an editorial/domain knowledge graph 414 with general information. For example, the data source 410 may be a search-log containing information such as context, queries, resulting URLs, title documents, and other labels. In addition to this information, the knowledge graphs 412, 414 are used to augment the matrix. The matrix builder 408 combines this information into a design matrix containing queries, features, and labels.

The design matrix is output from the matrix builder 408 and is used as an input to train the factorization machine 406. The trained factorization machine 406 outputs a linear and k-dimension vector for each of the features of the design matrix.

The ad-document index and the design matrix are used as inputs to the online component 404. The online component 404 receives a query 416, which is input into an intent classifier 418 to determine an intent of the user submitting the query 416. For example, a query 416 may be parsed to determine if it contains specific phrasing that are common to a classification, such as travel or retail. In some embodiments, text such as hotel, flight, travel, may indicate a travel classification. In some embodiments, the context of the query 416 may be used to determine a classification of the query 416. For example, if a user was previously searching for vacations prior to receiving the new query 416, the subsequent query 416 may be biased towards a travel classification. In some embodiments, the intent classifier may perform a multilevel classification of the query in which a broad intent is first identified, and then finer taxonomy nodes are identified based on the broad intent. More information regarding classification of a query may be found in Shen et al. "*Query Enrichment for Web-query Classification*". ACM TOIS, Vol. 24, No. 3, July 2006, which is hereby incorporated by reference.

The intent classifier 418 passes the query 416 along with any classification information to a query processor 420 which enhances the query 416 using any available semantics, which may be dependent on the classification determined by the intent classifier 418. For example, if the intent classifier 418 determined a classification of travel, the query 416 may be enhanced by parsing the query 416 for dates and location. Or if the intent classifier 418 determined the intent was related to retail, the query 416 may be parsed and annotated to include information such as a brand, product line, or common retailer. In some embodiments, the query processor may implement a named entity recognizer for each of the top level classifications determined by the intent classifier. More information regarding named entity recognition may be found at Eiselt, Andreas; Figueroa, Alejandro (2013). *A Two-Step Named Entity Recognizer for Open-Domain Search Queries*. IJCNLP. pp. 829-833, which is hereby incorporated by reference.

A query expander 422 may be used to expand the enhanced query using conventional techniques to obtain an expanded query. This is optional and depending on desired coverage, may be excluded in some embodiments. In addition, a term weigher 424 assigns weights to the various terms in the query 416 dependent on the classification. For example, terms that have identified semantics may have a higher weight than terms without semantics, or a particular type of semantic may be given a higher weight. For instance, in a retail classification, if a brand is determined based on the semantic parsing, it may be given a higher weight than other terms in the query 416. Or in a travel classification, a brand may have a lower weight than parsed travel dates or destinations.

In some embodiments, the resulting query may be in a different format that that required by an ad search system. In such instances, query generator 426 generates a retrieval search query specific to a particular search engine based on the enhanced and expanded query. Because different techniques exist for ranking queries to advertisements, the general query obtained in the prior steps may be modified to be compatible with a given query ad matching system.

An example of a query as it passes through the system is shown in FIG. 5. In block 501, the query is initially a three word phrase. In block 502, a classification associated with the query is found, and in this example the query is classified to belong to a classification of retail. Based on this classification, the query is enhanced using semantics related to retail. In this example, the query is parsed to determine if it contains words associated with a product or brand. Upon finding these terms, the terms are annotated to indicate their semantics as shown in block 503. In block 504, the query semantics have been weighted based on rules associated with the classification. In block 505, a complete query is shown compatible with a common ad index search engine.

Returning to FIG. 4, an ad search engine 428 uses the index created by the indexer to output a ranked group of ad-query combinations. The ad search engine may rank ads to queries based on a relatedness determined by a ranking algorithm such as BM25, TF/IDF, nativeRank, or other language models. Although ad search engine 428 as a part of the online component, in some embodiments the query generator may generate a query for a third-party ad search engine, which then returns the group of ad-query combinations. Each query-ad combination is then scored by a factorization machine ranker 430 using the output of the trained factorization machine 406. For a given query/ad combination, all the necessary features to compute a relevance score from factorization machine. The factorization machine ranker 430 reranks the query-ad. The reranked query-ad combinations are then output for subsequent processing. For example, the reranked list may be used as an input to a bid auction for selecting an advertisement for serving.

FIG. 6 illustrates a method 600 for ranking advertisements-query combinations. The method may be implemented as computer executable instructions programmed to cause a processor to perform the described functions. Each function described in the method may be performed by a single computer system, or the functions may be distributed over two or more computer systems.

In block 602, the method begins upon receipt of a search query, such as query 416. The source of the search query 416 may be from a user entering search text into a search engine. The search engine would return search results, while the text of the query would be processed through the described system to find relevant advertisements.

The query is then classified in block 604. In the embodiment of FIG. 4, the intent classifier classifies the query based on an intent of the user. The intent may be inferred based on the context of the query, key phrases contained in the query, or by other means. The query is then enhanced in block 606 to include semantic information related to the classification. For example, query processor 420 may parse the query to look for keywords related to the classification of the query and label them. In a retail classification, a recognized brand may be labeled as a brand, or a product line may be identified and labeled as such.

The query may be optionally expanded using the query expander 422 and the terms in the query are weighted at block 608. The term weigher 424 of the embodiment of FIG. 4 may be used to weigh the terms based on rules associated with the classification. An ad search query is then generated in block 610. The ad search query is generated in a format dependent upon the ad search engine selected for matching advertisements. In the embodiment of FIG. 4, query generator 426 may generate the query for use in ad search engine 428. At block 612, the ad search query is passed to an ad search engine for ranking advertisements according to their relatedness to the ad search query.

The top ranked ad-query combinations are retained at block 614 and reranked with a trained factorization machine at block 616. The ad-queries combinations may be reranked using the factorization machine ranker 430 of FIG. 4 with the trained factorization machine 406. The system then output the list of ad-query combinations for further processing, such as to an advertisement auction for selecting the highest value advertisement. For example, the ad-query combination may be ranked as a predicted click through rate, which may then be multiplied by a bid for each advertisement to determine the ad that results in the highest estimated revenue.

While various embodiments have been described above, it should be understood that they have been presented by way of example only, and not limitation. It will be apparent to persons skilled in the relevant arts) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
receiving a search query from a user;
performing a multilevel classification of the search query to determine an intent of the search query based upon a context of the search query corresponding to one or more prior searches performed by the user and identifying one or more taxonomy nodes based upon the intent, resulting in a classified search query;
enhancing the classified search query using semantics associated with the classification resulting in an enhanced query, wherein the enhancing comprises parsing and annotating the classified search query to include two or more annotations determined based upon the intent determined based upon the context corresponding to the one or more prior searches;
weighting terms of the enhanced query dependent upon the classification to obtain a weighted query, wherein the weighting comprises assigning a first term of the enhanced query a first weight based upon one or more semantics associated with the first term and assigning a second term of the enhanced query a second weight based upon zero semantics associated with the second term, wherein the first weight is higher than the second weight, wherein the first term is assigned the first weight higher than the second weight and the second term is assigned the second weight lower than the first weight based upon the first term being associated with one or more semantics and the second term not being associated with one or more semantics;
forming a retrieval search query for an ad ranking machine from the weighted query;
ranking a plurality of advertisements based upon relatedness to the retrieval search query;
determining advertisement-retrieval search query combinations based upon the plurality of advertisements and the retrieval search query;
keeping top k advertisement-retrieval search query combinations, of the advertisement-retrieval search query combinations, for processing;
inputting the top k advertisement-retrieval search query combinations into a trained learning machine ranking model to rerank the top k advertisement-retrieval search query combinations to generate a plurality of reranked advertisement-retrieval search query combinations comprising a first advertisement-retrieval search query combination corresponding to a first advertisement and a first search query and a second advertisement-retrieval search query combination corresponding to a second advertisement and a second search query; and
serving an advertisement, in response to the search query, based upon the plurality of reranked advertisement-retrieval search query combinations.

2. The method of claim 1, comprising determining the advertisement responsive to inputting the plurality of reranked advertisement-retrieval search query combinations into a click-prediction model.

3. The method of claim 1, wherein enhancing the classified search query comprises extracting semantics from the classified search query using a named entity recognizer.

4. The method of claim 1, wherein the first term is assigned the first weight higher than the second weight and the second term is assigned the second weight lower than the first weight based upon the first term being associated with a first type of semantic and the second term being associated a second type of semantic.

5. The method of claim 1, comprising expanding the terms of the enhanced query prior to forming the retrieval search query.

6. The method of claim 1, comprising:
building an ad-query index relating ads to query terms.

7. The method of claim 1, comprising:
building a design matrix from a data source, wherein the design matrix comprises one or more entries comprising one or more queries, one or more entries comprising one or more query semantics, one or more entries comprising advertisement information, one or more entries comprising one or more advertisement matching features, and one or more entries comprising one or more labels; and
training a factorization machine to obtain a vector for each feature of the design matrix.

8. The method of claim 7, wherein the data source comprises a search log.

9. The method of claim 8, wherein the data source is enhanced with a knowledge graph for a particular classification.

10. A system, comprising:
an offline component, implemented prior to receipt of one or more queries, comprising:
a factorization machine configured to build a linear, multi-dimension vector for each feature of a design matrix; and
an indexing component configured to build an index relating queries and ads; and
an online component, implemented after receipt of the one or more queries at least in part via a processor, comprising:
a component configured to:
receive a search query from a user;
performing a multilevel classification of the search query to determine an intent of the search query based upon a context of the search query corresponding to one or more prior searches performed by the user and identifying one or more taxonomy nodes based upon the intent, resulting in a classified search query;
enhance the classified search query using semantics associated with the classification resulting in an enhanced query, wherein the enhancing comprises parsing and annotating the classified search query to include two or more annotations determined based upon the intent determined based upon the context corresponding to the one or more prior searches;
a query matching component utilizing the index to:
weight terms of one or more queries, comprising the enhanced query, dependent upon the classification to obtain a weighted query, wherein the weighting comprises assigning a first term of the one or more queries a first weight based upon one or more semantics associated with the first term and assigning a second term of the one or more queries a second weight based upon zero semantics associated with the second term, wherein the first weight is higher than the second weight, wherein the first term is assigned the first weight higher than the second weight and the second term is assigned the second weight lower than the first weight based upon the first term being associated with one or more semantics and the second term not being associated with one or more semantics; and
forming a retrieval search query for an ad ranking machine from the weighted query;
an advertising ranking component configured to:
rank a plurality of advertisements based upon relatedness to the retrieval search query;
determine advertisement-retrieval search query combinations based upon the plurality of advertisements and the retrieval search query;
keep top k advertisement-retrieval search query combinations, of the advertisement-retrieval search query combinations, for processing; and
input the top k advertisement-retrieval search query combinations into a trained learning machine ranking model to rerank the top k advertisement-retrieval search query combinations to generate a plurality of reranked advertisement-retrieval search query combinations comprising a first advertisement-retrieval search query combination corresponding to a first advertisement and a first search query and a second advertisement-retrieval search query combination corresponding to a second advertisement and a second search query; and
an ad serving component configured to serve an advertisement, in response to the search query, based upon the plurality of reranked advertisement-retrieval search query combinations.

11. The system of claim 10, wherein the factorization machine is configured to receive a search log and to build the design matrix from the search log.

12. The system of claim 11, wherein the factorization machine is configured to receive a knowledge graph and enhance the search log with the knowledge graph.

13. The system of claim 10, wherein at least one of the first term or the second term is associated with at least one semantic.

14. The system of claim 10, wherein the ad serving component is configured to determine the advertisement responsive to inputting the plurality of ranked advertisements into a click-prediction model.

15. The system of claim 10, wherein the first term is assigned the first weight higher than the second weight and the second term is assigned the second weight lower than the first weight based upon the first term being associated with a first type of semantic and the second term being associated a second type of semantic.

16. The system of claim 15, wherein the first type of semantic is different than the second type of semantic.

17. The system of claim 15, wherein in a first classification, the first type of semantic is associated with higher weight than the second type of semantic.

18. A non-transitory computer readable medium comprising instructions that when executed by a processor perform a method, the method comprising:
receiving a search query from a user;
performing a multilevel classification of the search query to determine an intent of the search query based upon a context of the search query corresponding to one or more prior searches performed by the user and identifying one or more taxonomy nodes based upon the intent, resulting in a classified search query;
enhancing the classified search query using semantics associated with the classification resulting in an enhanced query, wherein the enhancing comprises parsing and annotating the classified search query to include two or more annotations determined based upon the intent determined based upon the context corresponding to the one or more prior searches;
weighting terms of the enhanced query dependent upon the classification to obtain a weighted query, wherein the weighting comprises assigning a first term of the enhanced query a first weight based upon one or more semantics associated with the first term and assigning a second term of the enhanced query a second weight based upon zero semantics associated with the second term, wherein the first weight is higher than the second weight, wherein the first term is assigned the first weight higher than the second weight and the second term is assigned the second weight lower than the first weight based upon the first term being associated with one or more semantics and the second term not being associated with one or more semantics;
forming a retrieval search query for an ad ranking machine from the weighted query;

ranking a plurality of advertisements based upon relatedness to the retrieval search query;

determining advertisement-retrieval search query combinations based upon the plurality of advertisements and the retrieval search query;

keeping top k advertisement-retrieval search query combinations, of the advertisement-retrieval search query combinations, for processing;

inputting the top k advertisement-retrieval search query combinations into a trained learning machine ranking model to rerank the top k advertisement-retrieval search query combinations to generate a plurality of reranked advertisement-retrieval search query combinations comprising a first advertisement-retrieval search query combination corresponding to a first advertisement and a first search query and a second advertisement-retrieval search query combination corresponding to a second advertisement and a second search query; and serving an advertisement, in response to the search query, based upon the plurality of reranked advertisement-retrieval search query combinations.

19. The non-transitory computer readable medium of claim 18, the method comprising determining the advertisement responsive to inputting the plurality of reranked advertisement-retrieval search query combinations into a click-prediction model.

* * * * *